United States Patent
Kwon et al.

(10) Patent No.: US 11,999,404 B2
(45) Date of Patent: Jun. 4, 2024

(54) STEERING DEVICE EQUIPPED WITH DISPLAY

(71) Applicant: HL MANDO CORPORATION, Gyeonggi-do (KR)

(72) Inventors: Hyunbi Kwon, Gyeonggi-do (KR); Seungwoo Cheon, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 18/117,361

(22) Filed: Mar. 3, 2023

(65) Prior Publication Data

US 2023/0278620 A1 Sep. 7, 2023

(30) Foreign Application Priority Data

Mar. 4, 2022 (KR) .................. 10-2022-0028015

(51) Int. Cl.
- *B62D 1/10* (2006.01)
- *B60R 11/02* (2006.01)
- *B62D 5/00* (2006.01)
- *B60K 35/60* (2024.01)
- *B60R 11/00* (2006.01)

(52) U.S. Cl.
CPC .............. *B62D 1/105* (2013.01); *B60K 35/60* (2024.01); *B60K 2360/782* (2024.01); *B60R 2011/001* (2013.01); *B60R 11/0229* (2013.01); *B60Y 2400/92* (2013.01); *B62D 5/006* (2013.01)

(58) Field of Classification Search
CPC . B62D 1/04; B62D 1/046; B62D 1/10; B62D 5/006; B62D 1/105; B60K 2370/782; B60R 11/0229; B60R 2011/001; B60Y 2400/92
See application file for complete search history.

(56) References Cited

U.S. PATENT DOCUMENTS

| 5,465,632 | A * | 11/1995 | Oki ...................... | B62D 1/187 |
| | | | | 74/484 R |
| 11,407,436 | B2 * | 8/2022 | Scheick ................ | B62D 1/046 |
| 2019/0092373 | A1 * | 3/2019 | Nofzinger ............. | B62D 5/006 |

FOREIGN PATENT DOCUMENTS

| CN | 111845909 A | * 10/2020 | |
| DE | 102005053176 A1 | * 5/2007 | ............. B60K 35/00 |
| KR | 10-2017-0033026 | 3/2017 | |
| WO | WO-2020065159 A1 | * 4/2020 | ............. B62D 1/185 |

OTHER PUBLICATIONS

Machine translation of CN 111845909 A obtained on Jul. 6, 2023.*
Machine translation of DE 102005053176 A1 obtained on Jul. 6, 2023.*

* cited by examiner

*Primary Examiner* — Adam D Rogers
(74) *Attorney, Agent, or Firm* — Ladas & Parry, LLP

(57) ABSTRACT

The present invention provides a steering device equipped with a display including a steering wheel 100; a display 200 disposed at a position corresponding to a center portion of the steering wheel 100; an adapter 210 configured to fix the display 200; a steering feedback device 500 connected to the steering wheel 100 and the adapter 210 and including a non-rotating fixed portion and a rotating rotation portion; and a shaft located at a center portion inside the steering feedback device 500, the steering wheel 100 is connected to the rotation portion of the steering feedback device 500, and the adapter 210 is connected to the fixed portion of the steering feedback device 500.

11 Claims, 9 Drawing Sheets

Related Art

STEERING DEVICE EQUIPPED WITH DISPLAY

CROSS-REFERENCE TO RELATED APPLICATIONS

This application claims benefit and priority to Korean Patent Application No. 10-2022-0028015, filed on Mar. 4, 2022, with the Korean Intellectual Property Office, the disclosure of which is incorporated herein in its entirety by reference.

TECHNICAL FIELD

The present invention relates to a steering device equipped with a display, and more particularly, to a steering device equipped with a display that is mounted on a steering wheel of a steer-by-wire (SbW) steering system of a vehicle and maintains a fixed state even when the steering wheel is rotated.

BACKGROUND

In general, a vehicle steering system is a device included in a vehicle so that a driver can turn the vehicle in a desired direction by operating a steering wheel provided in a driver seat.

Recently, an electric power steering (hereinafter referred to as an 'EPS') device in which a steering motor provides necessary steering force under electronic control has been widely used.

Such an EPS device operates to rotate a steering column or move a rack bar connected thereto by driving an EPS steering motor according to steering torque applied to a steering wheel by a driver.

To this end, the EPS device includes the EPS steering motor, and a steering electronic control unit (ECU) that controls the steering motor. A speed reducer is connected to the steering motor, and operates in conjunction with the steering column or rack bar.

Meanwhile, a steer-by-wire (SbW) system that satisfies a demand for parts sharing due to a free layout in a flow of a vehicle changing from a transportation means to a mobility space and is applicable to various vehicle platforms such as a skateboard tends to get attention as a future steering device.

The steer-by-wire (SbW) system is an electric signal type intelligent steering system that transfers a steering intention of a driver as an electric signal without a mechanical connection between a steering wheel for a driver and wheels, and performs control. That is, in the SbW steering system, a mechanical connection device such as a steering column, an universal joint, or a pinion shaft between the steering wheel and the wheel is removed, and an electric motor is instead used for steering of the vehicle.

SbW includes a road wheel actuator (RWA), which is an actuator that transfers a steering intention of a driver to wheels of a vehicle to move the wheels, and a steering feedback actuator (SFA), which is an actuator that provides reaction of the steering wheel to the driver (see FIG. 1). The SFA is also referred to as a steering feedback device.

More specifically, the SbW system generally includes an upper device (expressed as an SFA), a lower device, and a control device that controls these.

The upper device (SFA) may include a torque sensor that is connected to the steering wheel and detects torque applied to the steering wheel, and a reaction motor serving as a motor device for providing reaction torque to the steering wheel according to steering through a rack bar in a lower portion.

The lower device generates a steering auxiliary torque signal proportional to steering torque applied to the steering wheel, and uses the steering auxiliary torque signal to control a steering drive motor or a steering drive actuator (RWA) that drives a pinion gear or ball nut mechanism for moving the rack bar connected to a tie rod of the wheel to the left and right.

Meanwhile, a display unit that displays information on driving of the vehicle may be provided on the steering wheel, and a display mounted on an existing steering wheel rotates together with the steering wheel when the driver performs steering, making it inconvenient for the driver to view displayed information.

In order to solve this problem, Patent Document 1 (Korean Laid-Open Patent Publication No. 10-2017-0033026) proposes a steering device capable of maintaining a fixed state of a display device even when a steering wheel is rotated. Referring to FIG. 2, the steering device 1 disclosed in Patent Document 1 includes a steering column 10, a steering wheel 20, a support 30, and a display unit 40. The steering wheel 20 is coupled to an upper end portion of the steering column 10, and the steering column 10 serves to transfer rotational force of the steering wheel 20 to a steering shaft of a steering gearbox. The support 30 is formed with the same axis as the steering column 10, and maintains a fixed state even when the steering column rotates with the steering wheel 20. The display unit 40 is installed in an upper end portion of the support 30, is located at a center of the steering wheel 20, and can maintain a fixed state without rotating together with the rotation of the steering wheel 20.

That is, in the steering device of Patent Document 1, the steering wheel 20 is coupled to the steering column 10 that transfers the rotational force of the steering wheel 20 to the steering shaft, and rotates together, the display unit 40 is installed on the support 30 that is fixed and does not rotate, and a fixed state of the display unit 40 is maintained even when the steering wheel 20 is rotated.

Incidentally, since Patent Document 1 is applied to a steering system including the steering column 10 that transfers the rotational force of the steering wheel 20, and the support that is fixed and does not rotate, there is a problem that Patent Document 1 cannot be applied to a SbW system that does not include the steering column 10 and the support 30).

(Patent Document 1) Korean Unexamined Patent Publication No. 10-2017-0033026 (published date: Mar. 24, 2017)

SUMMARY

The present invention has been made to solve the problems of the related art, and an object of the present invention is to provide a steering device equipped with a display that maintains a fixed state even when a steering wheel rotates without a complicated structure in a vehicle to which a steering feedback device (SFA) is applied.

A steering device equipped with a display according to an embodiment of the present invention for solving the above problem includes a steering wheel; a display disposed at a position corresponding to a center portion of the steering wheel; an adapter configured to fix the display; a steering feedback device connected to the steering wheel and the adapter and including a non-rotating fixed portion and a rotating rotation portion; and a shaft located at a center portion inside the steering feedback device, wherein the steering wheel is connected to the rotation portion of the steering feedback device, and the adapter is connected to the fixed portion of the steering feedback device.

The shaft may be included in the fixed portion of the steering feedback device, the shaft may include a first shaft provided at a portion directed to the steering wheel, and a second shaft provided at a portion directed to a side opposite to the steering wheel, and one end of the adapter may be connected to the first shaft.

At an end portion opposite to the steering wheel, the second shaft may be fixedly coupled to a vehicle mount.

The steering wheel may include a plurality of wheel frames extending toward a forward side of a vehicle and a center of rotation of the steering wheel, and the wheel frame may be fixedly coupled to the rotation portion of the steering feedback device.

The adapter may include a holding plate formed flat to face the display, and a holding portion bent vertically at both ends of the holding plate to fix the display.

The adapter may include a shaft fixing portion extending toward the first shaft, and the shaft fixing portion is fixedly coupled to the first shaft.

The shaft fixing portion may have a concave portion formed so that one end of the first shaft can be accommodated, and the one end of the first shaft may be inserted into and fixedly coupled to the concave portion.

In the one end of the first shaft, a seating portion formed with a smaller outer diameter may be inserted into the concave portion of the shaft fixing portion.

A tab may be formed in one end inside of the first shaft, and a torsion bar may penetrate the tab and be inserted into one end inside of the first shaft.

A torsion bar may be accommodated inside the first shaft and the second shaft, and a right end of the second shaft may be inserted into and fixedly coupled to a concave portion formed in the vehicle mount.

The fixed portion of the steering feedback device may include the first shaft, the second shaft, and the vehicle mount.

The rotation portion of the steering feedback device may include a housing and a cover disposed outside the fixed portion.

A first bearing may be disposed between the first shaft and the housing, an inner race of the first bearing may be included in the fixed portion, and an outer race may be included in the rotation portion.

A second bearing may be disposed between the second shaft and the housing, an inner race of the second bearing may be included in the fixed portion, and an outer race may be included in the rotation portion.

ADVANTAGEOUS EFFECTS

The steering device equipped with a display according to the present invention configured as above can provide the steering device equipped with a display that maintains a fixed state even when the steering wheel rotates by connecting the display to a fixed shaft of the steering feedback device without a complicated structure.

DETAILED DESCRIPTION

Hereinafter, a steering device equipped with a display according to the present invention will be described in detail with reference to FIGS. 3 to 9.

Figure 1:
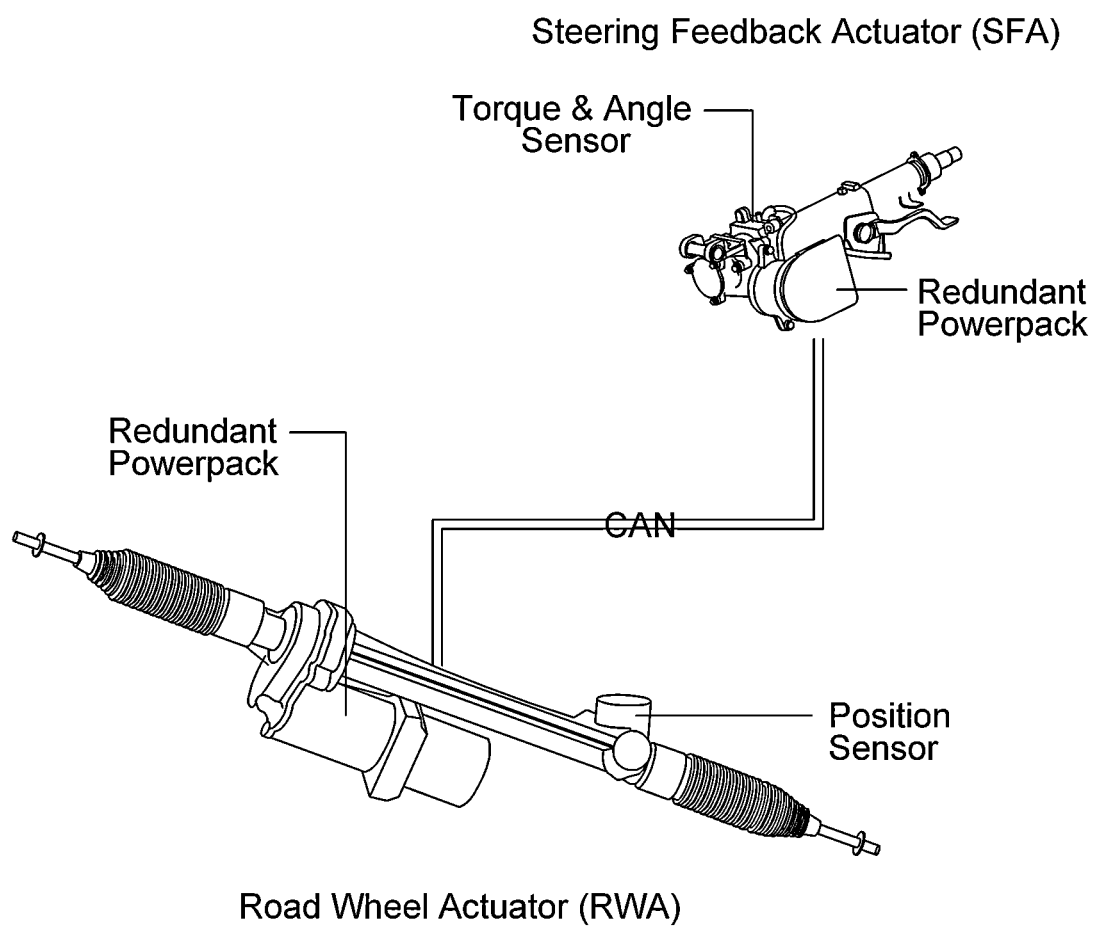
FIG. 1 is a view schematically illustrating a SbW system including a steering feedback device (SFA) and a road wheel actuator (RWA).
Figure 2:
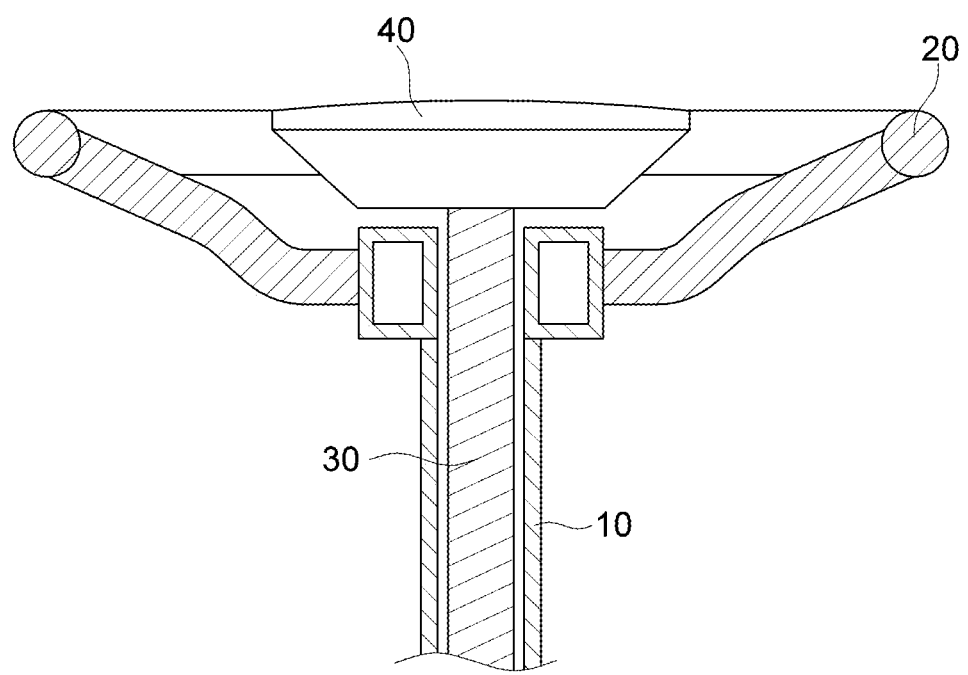
FIG. 2 is a view illustrating a steering device in which a display device can maintain a fixed state even when a steering wheel of the related art rotates.
Figure 3:
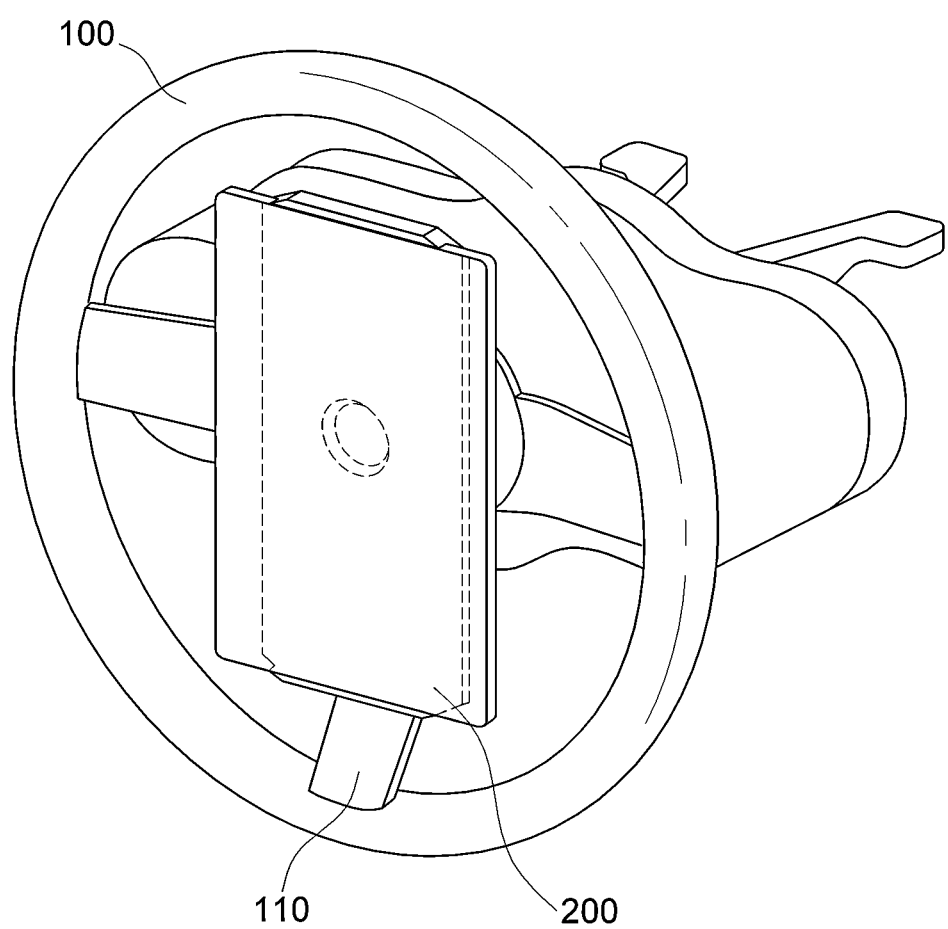
FIG. 3 is a view schematically illustrating a steering device equipped with a display according to an embodiment of the present invention.

FIG. 3 schematically illustrates a steering device equipped with a display according to an embodiment of the present invention. A display 200 displaying various types of vehicle information is mounted at a center of a steering wheel 100 for steering wheels of a vehicle. The display 200 is mounted to maintain a fixed state even when the steering wheel 100 is rotated.

Figure 4:
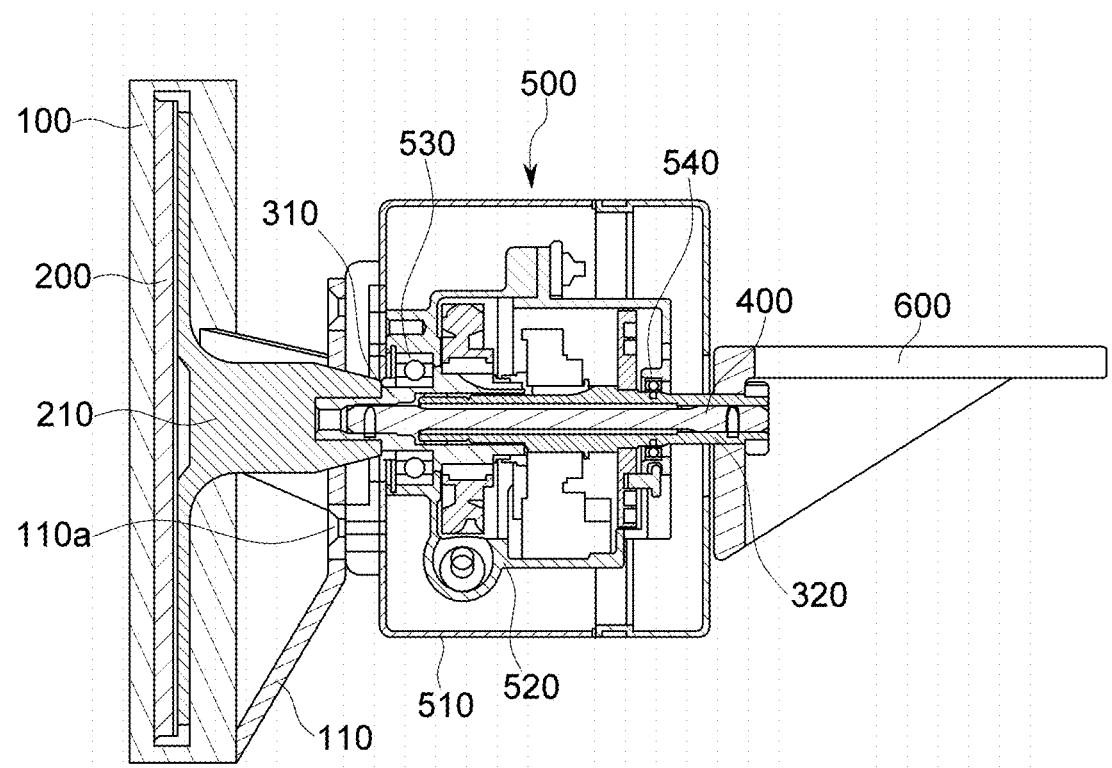
FIG. 4 is a cross-sectional view illustrating a specific structure of the steering device equipped with a display according to an embodiment of the present invention.

FIG. 4 is a cross-sectional view illustrating a specific structure of the steering device equipped with a display according to an embodiment of the present invention.

In a steering device of the vehicle to which a steering feedback device (SFA) 500 is applied, the display 200 is mounted at a position corresponding to a center portion of the steering wheel 100 through an adapter 210 so that the display 200 faces a driver in the vehicle. The display 200 is fixed by the adapter 210. The steering wheel 100 is configured to enable a relative rotational motion with respect to the display 200 and the adapter 210.

Each of the steering wheel 100 and the adapter 210 are connected to the steering feedback device 500.

The steering feedback device 500 includes a torque sensing unit that senses torque to be applied to the steering wheel 100, and a reaction motor serving as a motor device for providing reaction torque to the steering wheel according to steering through the rack bar in the lower portion. The steering feedback device 500 includes a rotation portion that rotates together according to rotation of the steering wheel 100, and a fixed portion that does not rotate. The steering wheel 100 is connected to the rotation portion of the steering feedback device 500, and the adapter 210 is connected to the fixed portion of the steering feedback device 500.

The steering feedback device 500 includes a torsion bar 400 provided at a center in the inside, a first shaft 310 that surrounds the torsion bar 400 at a position adjacent to the adapter 210, and a second shaft 320 that is adjacent to a vehicle mount at a position opposite to the adapter 210 and surrounds the torsion bar 400.

Further, the steering feedback device 500 includes a housing 520 that surrounds the first shaft 310, the second shaft 320, and other necessary components. A cover 510 surrounds an outermost portion.

A first bearing 530 is disposed between the first shaft 310 and the housing 520, and a second bearing 540 is disposed between the second shaft 320 and the housing 520.

The torsion bar 400 and the second shaft 320 are fixed with a fixing mechanism such as a pin so that the torsion bar 400 and the second shaft 320 do not rotate relative to each other, and one end portion of each of the torsion bar 400 and the second shaft 320 is fixed to the vehicle mount 600 so that the torsion bar 400 and the second shaft 320 do not rotate.

The first shaft 310 is fixed to the torsion bar 400 by a fixing mechanism such as a pin so that the first shaft 310 does not rotate.

The adapter 210 is fixed to the first shaft 310. Therefore, the vehicle mount 600 that is fixed and does not rotate, the torsion bar 400 fixed to the vehicle mount 600, the first shaft 310 fixed to the torsion bar 400, the adapter 210 fixed to the first shaft 310, and the display 200 fixed to the adapter 210 can always maintain a fixed state regardless of the rotation of the steering wheel 100.

Here, the vehicle mount 600, the torsion bar 400, the first shaft 310, and the second shaft 320 form the fixed portion of the steering feedback device 500.

In the steering feedback device 500, components located outside the fixed portion, including the housing 520 and the cover 510 located outside the fixed portion, form the rotation portion that can rotate relative to the fixed portion.

The steering wheel 100 includes a wheel frame 110 formed to be centered toward the forward side of the vehicle, and the wheel frame 110 is coupled to the rotation portion of the steering feedback device 500. Accordingly, as the steering wheel 100 rotates, the rotation portion of the steering feedback device 500 rotates together, and the fixed portion and the display 200 do not rotate.

Figure 5:
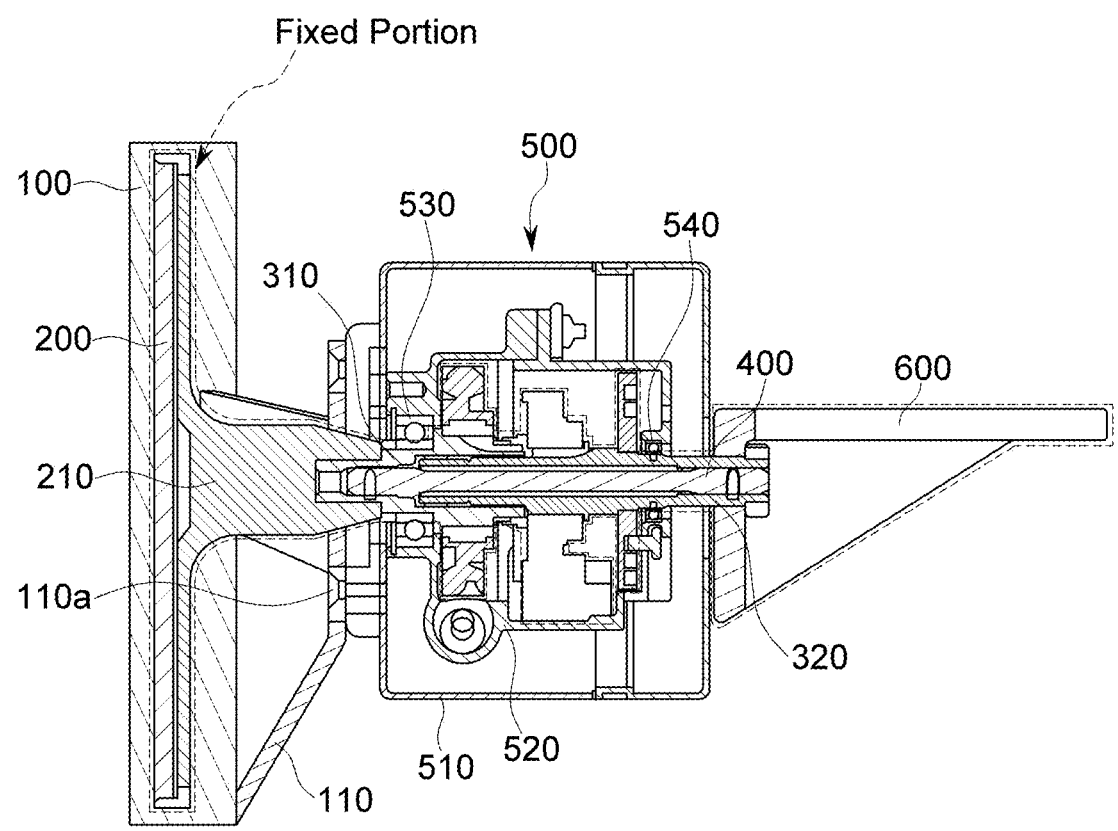
FIG. 5 is a view illustrating a portion that rotates together with rotation of the steering wheel and a portion that does not rotate in the steering device equipped with a display according to an embodiment of the present invention.

FIG. 5 illustrates a portion that rotates together with rotation of the steering wheel 100 and a portion that does not rotate in the steering device equipped with a display according to an embodiment of the present invention. A portion located inside a red dotted line is the portion that rotates, and a portion located outside the red dotted line is the portion that does not rotate.

That is, the portion that does not rotate include the display 200, the adapter 210, the first shaft 310, the torsion bar 400, the second shaft 320, and the vehicle mount 600. The portion that rotates includes the steering wheel 100, the wheel frame 110, the housing 520, and the cover 510.

Meanwhile, respective inner races of the first bearing 530 and the second bearing 540 are disposed in close contact with the first shaft 310 and the second shaft 320, and are included in the portion that does not rotate. Further, each of outer race of the first bearing 530 and the second bearing 540 is fixed to the housing 520 and included in the portion that rotates together with the housing 520.

A structure in which the steering wheel 100 is coupled to the rotation portion of the steering feedback device 500 will be described with reference to FIGS. 4 and 5.

The steering wheel 100 includes a plurality of wheel frames 110 extending toward the forward side of the vehicle in a direction toward the center of rotation. The wheel frame 110 is coupled to a predetermined area of the rotation portion of the steering feedback device 500 by a plurality of fixing members 110a. An example of the fixing member 110a may include a bolt, and may include various known coupling elements in addition to the bolt.

Since the steering wheel 100 is fixedly coupled to the rotation portion of the steering feedback device 500, so that the steering wheel 100 and the rotation portion can rotate together.

Figure 6:
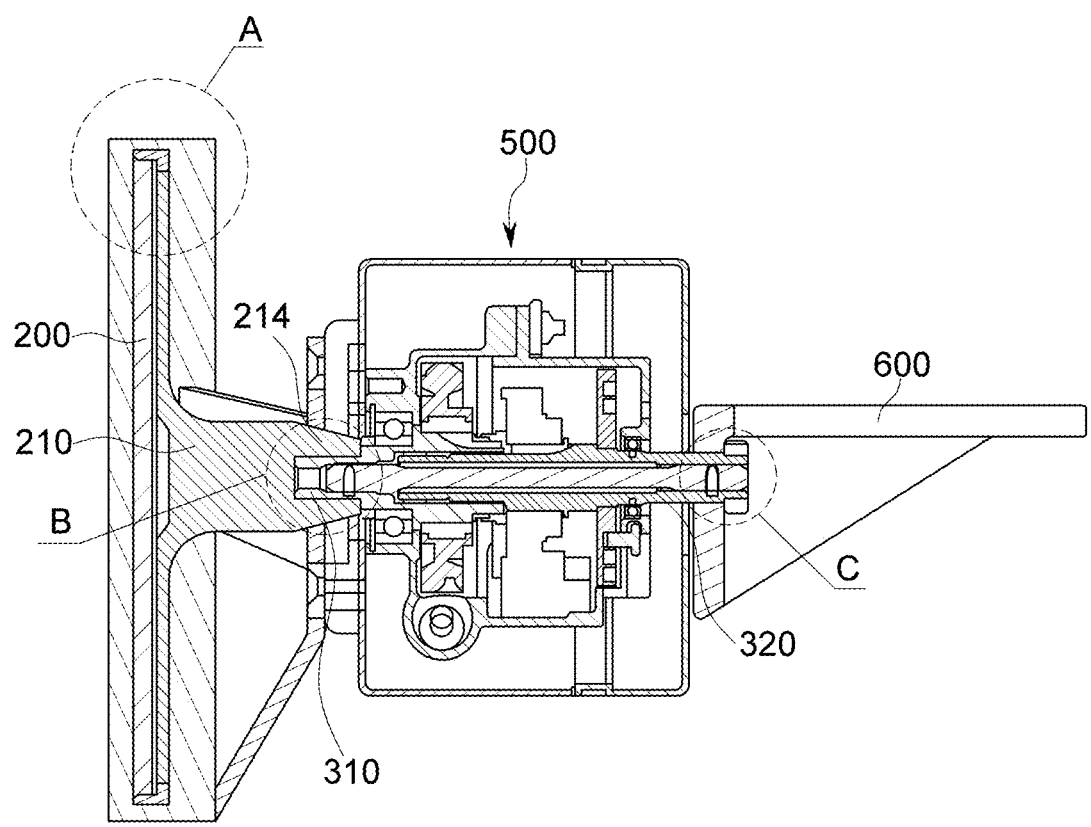
FIG. 6 is a view illustrating a coupling relationship between a display and an adapter, a coupling relationship between the adapter and a shaft, and a coupling relationship between the shaft and a vehicle mount in the steering device equipped with a display according to an embodiment of the present invention.

FIG. 6 illustrates a coupling relationship between the display and the adapter, a coupling relationship between the adapter and the shaft, and a coupling relationship between the shaft and the vehicle mount.

Figure 7:
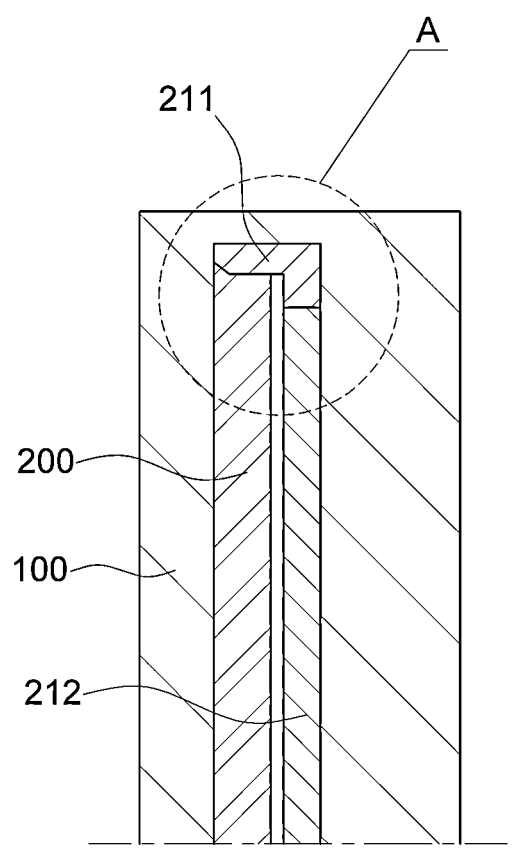
FIG. 7 is an enlarged view of an area A in FIG. 6.

In FIG. 6, an area A indicates a state in which the display 200 is coupled by the adapter 210, and FIG. 7 illustrates an area A in a more enlarged manner. The adapter 210 includes a body 213, a holding plate 212 formed flat toward the display 200 in the body 213, a holding portion 211 bent vertically at both ends of the holding plate 212 to fix the display 200, and a shaft fixing portion 214 that extends in a direction toward the shaft in the body 213. The display 200 is pressed at both ends and fixed by the holding portion 211 in a state in which the display 200 faces the holding plate 212 of the adapter 210.

Figure 8:
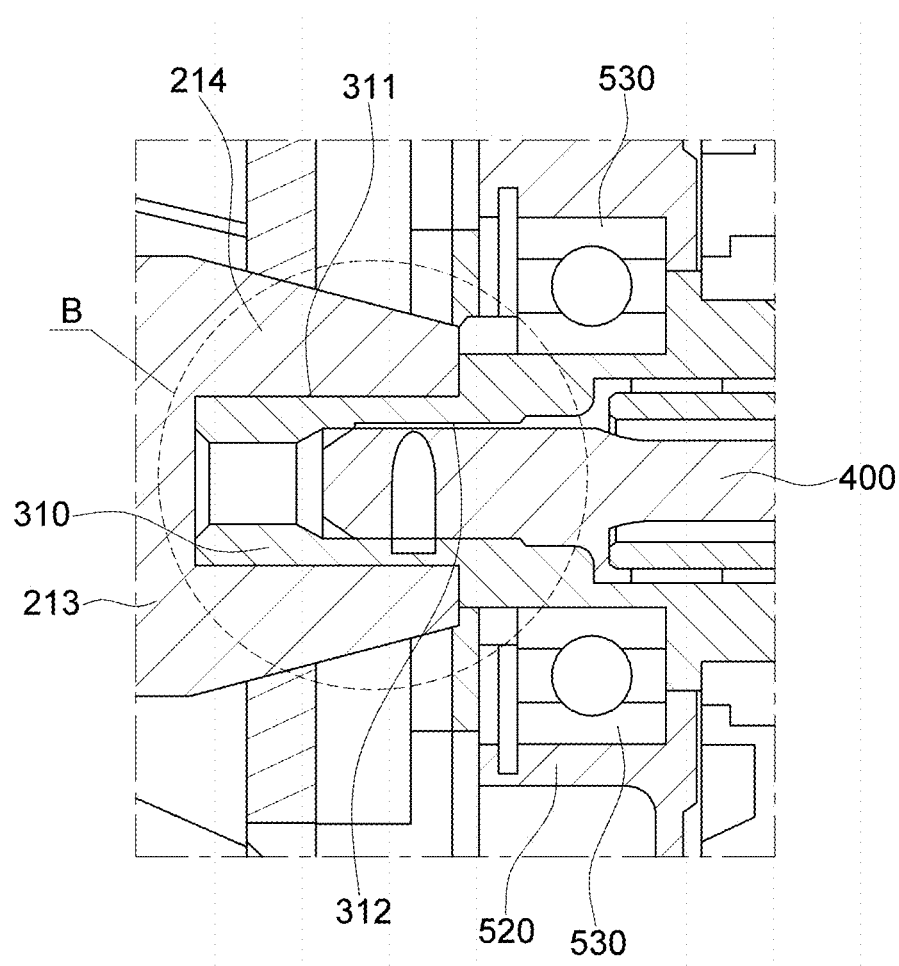
FIG. 8 is an enlarged view of an area B in FIG. 6.

In FIG. 7, a region B indicates a state in which the adapter 210 is coupled to the shaft. The shaft fixing portion 214 of the adapter 210 is coupled to the first shaft 310. This will be described in greater detail with reference to FIG. 8 illustrating an enlarged area B.

The shaft fixing portion 214 is formed at a right end of the adapter 210. The shaft fixing portion 214 has a concave portion formed so that one end of the first shaft 310 can be accommodated, and is coupled to the first shaft 310 through any coupling member in a state in which the one end of the first shaft 310 is inserted into the concave portion. Meanwhile, in the one end of the first shaft 310, a step is formed to have an outer circumferential surface having a size allowing insertion into the concave portion of the shaft fixing portion 214, and a seating portion 311 formed with a smaller outer diameter is inserted into the concave portion of the shaft fixing portion 214 and fixed.

A tab 312 is formed in one end inside of the first shaft 310, and the torsion bar 400 penetrates the tab, is inserted into the one end inside of the first shaft 310, and is fixed by a coupling member such as a pin in an inserted state.

Figure 9:
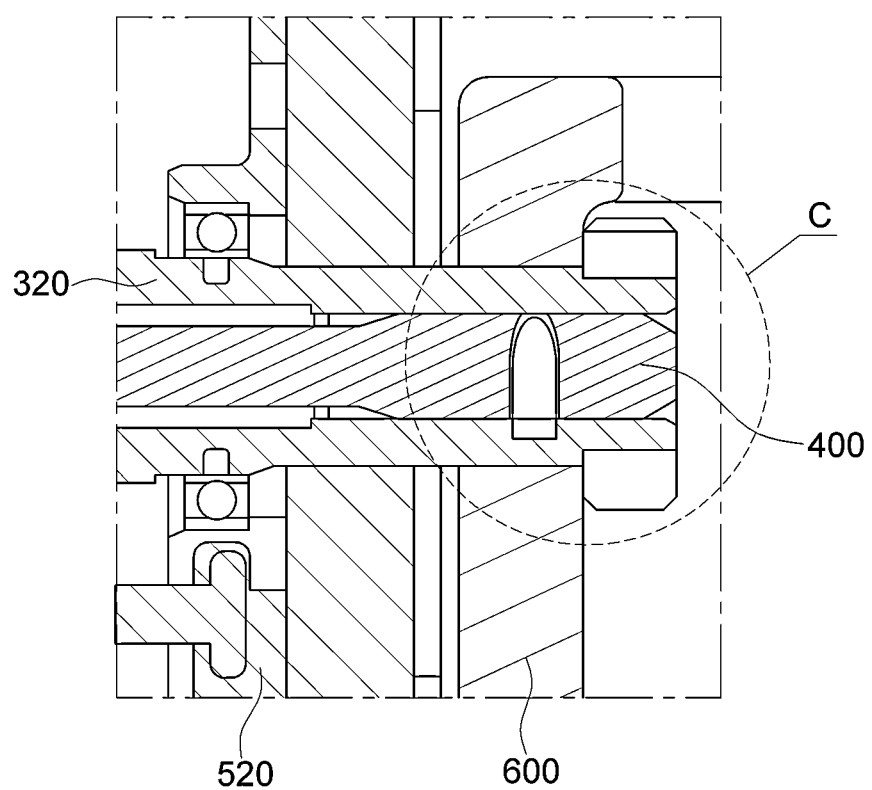
FIG. 9 is an enlarged view of an area C in FIG. 6.

In FIG. 7, an area C indicates a state in which the shaft is coupled to the vehicle mount 600, and an enlarged area C is illustrated in FIG. 9. A right end of the second shaft 320 surrounding the torsion bar 400 on the right side of the torsion bar 400 is inserted into a concave portion formed in the vehicle mount 600 and fixedly coupled by a coupling member such as a pin.

The above description is merely illustrative of the technical spirit of the present invention, and those skilled in the art will be able to make various modifications, changes, and substitutions without departing from the essential characteristics of the present invention. Therefore, the present embodiment is not intended to limit the technical spirit of the present invention, but to describe, and the scope of the technical spirit of the present invention is not limited by the embodiment. The protection scope of the present invention should be construed according to the claims below, and all technical spirits within the equivalent range should be construed as being included in the scope of the present invention.

DETAILED DESCRIPTION OF MAIN ELEMENTS

100: Steering wheel
110: Wheel frame
110a: Fixing member

200: Display
210: Adapter
211: Holding portion
212: Holding plate
213: Body
214: Shaft fixing portion
310: First shaft
311: Seating portion
312: Tab
320: Second shaft
400: Torsion bar
500: Steering feedback actuator
510: Cover
520: Housing
530: First bearing
540: Second bearing
600: Vehicle mount

What is claimed is:

1. A steering device comprising:
a steering wheel;
a display disposed at a position corresponding to a center portion of the steering wheel;
an adapter fixedly coupled to the display to fix the display;
a steering feedback device connected to the steering wheel and the adapter and including a non-rotating fixed portion and a rotating rotation portion; and
at least one shaft located at a center portion inside the steering feedback device,
wherein the steering wheel is connected to the rotation portion of the steering feedback device, and the adapter is connected to the fixed portion of the steering feedback device,
wherein:
the at least one shaft includes a first shaft provided at a portion directed to the steering wheel, and a second shaft provided at a portion directed to a side opposite to the steering wheel,
the second shaft is fixedly coupled to a vehicle mount at an end portion opposite to the steering wheel,
one end of the adapter is connected to the first shaft, and
the fixed portion of the steering feedback device includes the first shaft, the second shaft, and the vehicle mount.

2. The steering device of claim 1,
wherein the steering wheel includes a plurality of wheel frames extending toward a forward side of a vehicle and a center of rotation of the steering wheel, and
at least one of the plurality of wheel frames is fixedly coupled to the rotation portion of the steering feedback device.

3. The steering device of claim 1, wherein the adapter includes:
a holding plate formed flat to face the display, and
a holding portion bent vertically at both ends of the holding plate, the holding portion engaging with the periphery of the display to fix the display.

4. The steering device of claim 3,
wherein the adapter includes a shaft fixing portion extending toward the first shaft, and
the at least one shaft fixing portion is fixedly coupled to the first shaft.

5. A steering device comprising:
a steering wheel;
a display disposed at a position corresponding to a center portion of the steering wheel;
an adapter fixedly coupled to the display to fix the display;
a steering feedback device connected to the steering wheel and the adapter and including a non-rotating fixed portion and a rotating rotation portion; and
at least one shaft located at a center portion inside the steering feedback device,
wherein the steering wheel is connected to the rotation portion of the steering feedback device, and the adapter is connected to the fixed portion of the steering feedback device,
wherein:
the at least one shaft is included in the fixed portion of the steering feedback device,
the at least one shaft includes a first shaft provided at a portion directed to the steering wheel, and a second shaft provided at a portion directed to a side opposite to the steering wheel, and
one end of the adapter is connected to the first shaft,
wherein the adapter includes a holding plate formed flat to face the display, and a holding portion bent vertically at both ends of the holding plate to fix the display by gripping the display,
wherein the adapter includes a shaft fixing portion extending toward the first shaft, and the shaft fixing portion is fixedly coupled to the first shaft, and
the shaft fixing portion is fixedly coupled to the first shaft, and
wherein the shaft fixing portion has a concave portion formed so that one end of the first shaft can be accommodated, and
the one end of the first shaft is inserted into and fixedly coupled to the concave portion.

6. The steering device of claim 5, wherein in the one end of the first shaft, a seating portion formed with a smaller outer diameter is inserted into the concave portion of the shaft fixing portion.

7. The steering device of claim 6,
wherein a tab is formed inside the one end of the first shaft, and
a torsion bar penetrates the tab and is inserted into the inside of the one end of the first shaft.

8. A steering device comprising:
a steering wheel;
a display disposed at a position corresponding to a center portion of the steering wheel;
an adapter fixedly coupled to the display to fix the display;
a steering feedback device connected to the steering wheel and the adapter and including a non-rotating fixed portion and a rotating rotation portion; and
at least one shaft located at a center portion inside the steering feedback device,
wherein the steering wheel is connected to the rotation portion of the steering feedback device, and the adapter is connected to the fixed portion of the steering feedback device,
wherein:
the at least one shaft is included in the fixed portion of the steering feedback device,
the at least one shaft includes a first shaft provided at a portion directed to the steering wheel, and a second shaft provided at a portion directed to a side opposite to the steering wheel, and
one end of the adapter is connected to the first shaft,
wherein the second shaft is fixedly coupled to a vehicle mount at an end portion opposite to the steering wheel, and
wherein a torsion bar is accommodated inside the first shaft and the second shaft, and a right end of the second shaft is inserted into and fixedly coupled to a concave portion formed in the vehicle mount.

9. The steering device of claim 8, wherein the rotation portion of the steering feedback device includes a housing and a cover disposed outside the fixed portion.

10. The steering device of claim 9, wherein a first bearing is disposed between the first shaft and the housing, an inner race of the first bearing is included in the fixed portion, and an outer race is included in the rotation portion.

11. The steering device of claim 10, wherein a second bearing is disposed between the second shaft and the housing, an inner race of the second bearing is included in the fixed portion, and an outer race is included in the rotation portion.

* * * * *